Feb. 25, 1964  J. F. MARINE ETAL  3,122,178
MAGNETIC CORE PLANE THREADING MACHINE AND METHOD
Filed April 13, 1962  6 Sheets—Sheet 1

*INVENTORS*
JOHN F. MARINE
ROBERT T. SHEVLIN
BY

Feb. 25, 1964   J. F. MARINE ETAL   3,122,178
MAGNETIC CORE PLANE THREADING MACHINE AND METHOD
Filed April 13, 1962   6 Sheets-Sheet 3

INVENTORS
JOHN F. MARINE
ROBERT T. SHEVLIN
BY

Feb. 25, 1964    J. F. MARINE ETAL    3,122,178
MAGNETIC CORE PLANE THREADING MACHINE AND METHOD
Filed April 13, 1962    6 Sheets-Sheet 4

INVENTORS
JOHN F. MARINE
ROBERT T. SHEVLIN
BY
Roland A. Anderson
Attorney

INVENTORS
JOHN F. MARINE
ROBERT T. SHEVLIN
BY Roland A. Anderson
Attorney

FIG. 13

United States Patent Office 3,122,178
Patented Feb. 25, 1964

3,122,178
MAGNETIC CORE PLANE THREADING
MACHINE AND METHOD
John Ferre Marine, New York, and Robert T. Shevlin, Kew Gardens, N.Y., assignors to the United States of America as represented by the United States Atomic Energy Commission
Filed Apr. 13, 1962, Ser. No. 187,448
7 Claims. (Cl. 140—93)

The present invention relates to a magnetic core plane threading machine and, more particularly, to apparatus for threading magnetic cores for word-organized memories used in high-speed, general purpose digital computers.

In a typical memory core used for digital computers, ferrite toroidal cores are fixed in a staggered, three dimensional pattern which requires that substantially all wiring of the cores be accomplished by laborious, hand methods.

In order to simplify the wiring problem somewhat, it has been proposed, with successful results, to fix the ferrite cores in a lattice array formed by layers of planes. In one particular arrangement, this is accomplished by pre-assembling the ferrite cores in flat plastic boards that fix their geometry. The board thickness holding the cores is the same as that of the cores to obtain a flat unit easy to handle. Holes in the board are of the same diameter as the outside diameter of the cores, and the cores are then inserted into the holes and held in place with an adhesive spray or a cellophane overlay which is punctured during subsequent wiring or threading of the cores. The ferrite cores are wired in quadrature by hand, as in the case of the previously mentioned core array.

The cost of core memories of this type for use in large computers frequently runs to about forty percent of the cost of the whole computer. To give an example of the magnitude of the threading, or interlacing job involved in such memory systems, a recently constructed general-purpose computer having a memory system with 450,000 cores had to be interlaced with three and four electrical conductors each. This was done by hand with the result that not only was a very high percentage of the total cost of the computer due to this hand operation, it additionally represented a very substantial time element in the construction of this machine.

The present invention concerns a method and threading device which mechanically and automatically interlaces ferrite cores placed in a flat array as described above and hence, avoids much of the time and cost involved in the hand-wiring techniques generally in use. In accordance with this invention, there is provided for carrying out mechanically and automatically the threading of the cores, arranged as described, by a pair of reciprocating hooks between which the plane of the cores is situated. A pair of needles reciprocate to transfer a length of conductor or wire through each core while the aforementioned hooks reciprocate in order to engage with the conductor to thread the needles. At the beginning of each row of cores, the operation as described begins with a length of conductor sufficient to thread the whole row of cores. The needles and hooks cooperate in a unique fashion to transfer the loose end of the conductor up through one core and down through the next core until the whole row is completed and the conductor is exhausted.

It is, therefore, a first object of this invention to provide apparatus and a method for threading mechanically and automatically with conductors portions of the memory system of a digital computer.

It is still another object of this invention to provide a machine for automatically threading a row of hollow members.

Another object is to provide apparatus and method for interlacing with thread a series of spaced members.

Still another object of this invention is to prepare automatically and mechanically magnetic cores for word-organized memories used in digital computers.

Other objects and advantages of this invention will hereinafter become more evident from the following description of preferred embodiments of this invention taken with the accompanying drawings in which.

Figure 1:
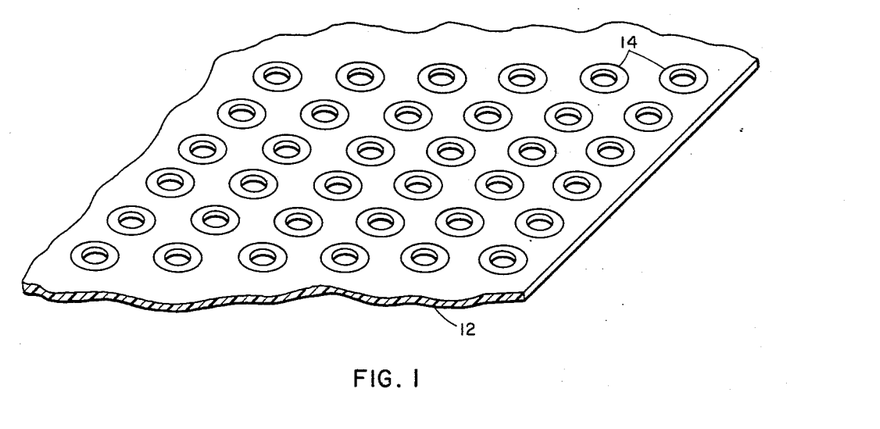
FIG. 1 is a portion of plastic board with ferrite cores mounted therein suitable for application of this invention.
Figure 2:
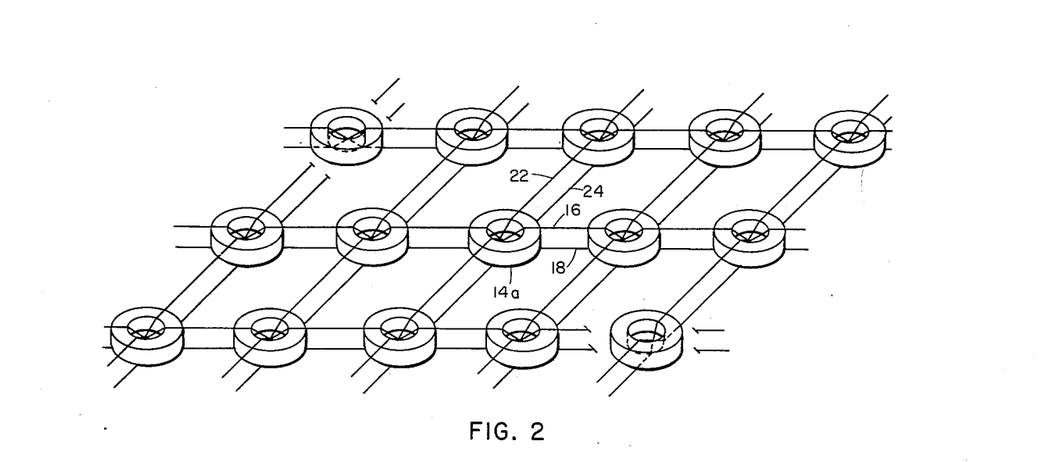
FIG. 2 is a schematic illustration of the core array and wiring.

Referring to FIG. 1, wherein there is shown a portion of a flat plastic board 12 with ferrite cores 14 pre-assembled therein, the thickness of board 12 may be substantially the same as that of ferrite cores 14. In assembling cores 14 into board 12, holes of the same diameter as the outside diameter of cores 14 are drilled or punched and cores 14 are then inserted into the holes and held in place with an adhesive spray or a thin plastic or cellophane overlay which is penetrated readily during the threading process. Core board 12 with ferrite cores 14 mounted therein are wired in accordance with this invention by threading two twisted pairs of magnetic wires as shown in FIG. 2 which schematically illustrates the core array and wiring. As is understood in the art, the magnetic wire is a conductive wire (or conductor) with a thin insulating coating which is sprayed or dipped on. In connection with a particular ferrite core 14A shown in FIG. 2 there are shown two pairs of twisted wires 16, 18 and 22, 24 threaded therethrough to illustrate the details of a typical wiring arrangement which may be obtained by the instant invention.

Figures 3, 4, 5:
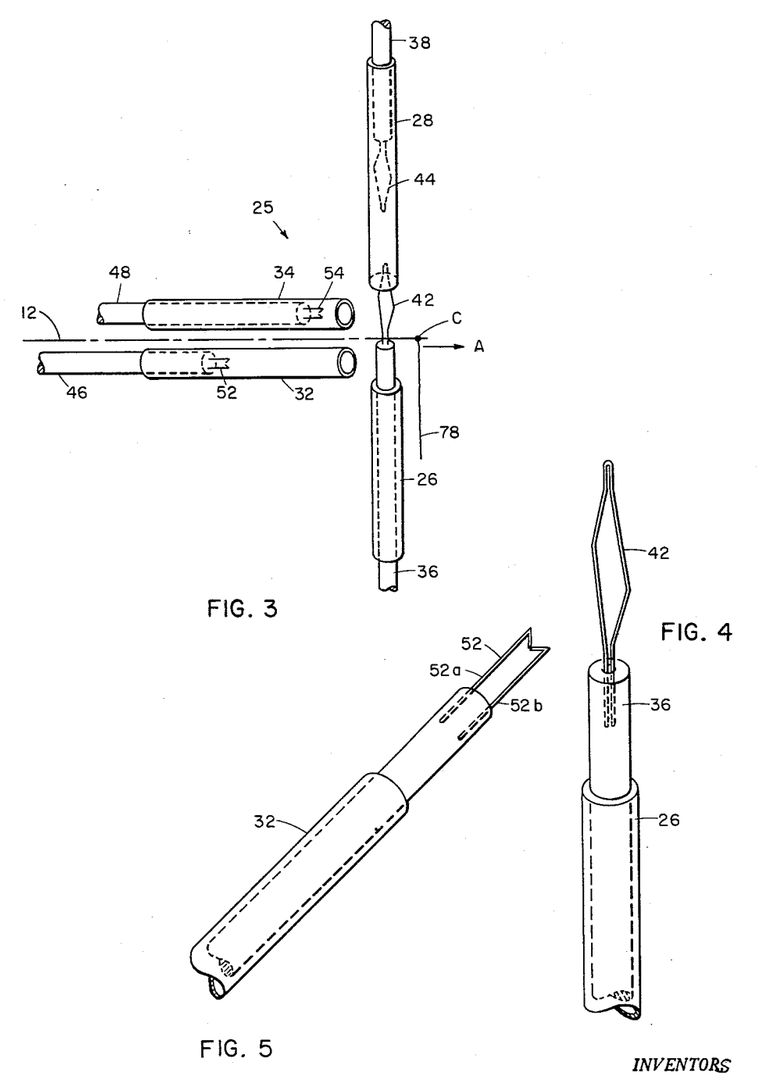
FIG. 3 is a schematic illustration of a threading sub-assembly in accordance with this invention.
FIGS. 4 and 5 show details of the needles and hooks as utilized in FIG. 3.
Figure 6:
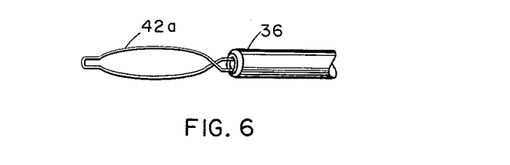
FIG. 6 shows an alternate needle shape.

Referring to FIG. 3, there is illustrated a threading sub-assembly 25 consisting of a pair of oppositely facing elongated, hollow cylinders 26 and 28, and a second pair of spaced hollow cylinders 32 and 34, which are parallel to each other and which terminate adjacent the ends of cylinders 26 and 28, respectively, as illustrated. The axes of cylinders 26, 28, 32 and 34, are all in the same plane for the embodiment illustrated. Cylinders 26 and 28 are designated the needle cylinders or tubes while cylinders 32 and 34 are designated the hook cylinders or tubes. Located within needle tubes 26 and 28 are solid slidable pistons 36 and 38, respectively, which have embedded in their facing ends a pair of needles or needle members 42 and 44, respectively, as illustrated. In similar fashion located within hook tubes 32 and 34 are a pair of hook bearing solid pistons 46 and 48 which have embedded in their ends facing tubes 26 and 28, hooks or hook members 52 and 54, respectively. More complete details of needles 42 and 44 are shown in FIG. 4 while those of hooks 52 and 54 are shown in FIG. 5. As shown in FIG. 4, needle 42 is constructed of a thin metal material such as tension steel spring wire formed into a rhombic or other suitable shape so that when the ends are mounted in piston 36 as illustrated under proper operating conditions the expanded sides may be squeezed together. Needle 44 not shown in FIG. 4 is identical to that of 42 and both needle assemblies contained within tubes 26 and 28 are identical. An alternate construction, a needle 42a, is illustrated in FIG. 6.

In FIG. 5 it is seen that hook 52 is actually an assembly consisting of a pair of hook elements 52a and 52b embedded at one end in an end face of piston 46. Elements 52a and 52b extend parallel to each other and terminate in free hooked ends with their points just barely touching as illustrated. The material making up hook 52 may also be tension steel spring wire. Hook 54 within tube 34 is identical to hook 52 located within tube 32.

In order properly to orient sub-assembly 25 as shown in FIG. 3 there is shown in phantom a side view of board 12. As will be evident from the description of needle 42, the latter penetrates the particular ferrite core lined up with the axis of cylinders 36 and 38. A more complete description of the mode of operation and the functional relationship between needles 42 and 44 and hooks 52 and 54 will follow further below.

Regarding the lengths of tubes 26, 28, 32 and 34, and their associated rods, it should be immediately pointed out that they should be such that each tube will be able to contain during translation of its respective rod, the latter fully retracted and the conductor fully extended in a length sufficient to thread a complete row of cores 14.

Figure 7:
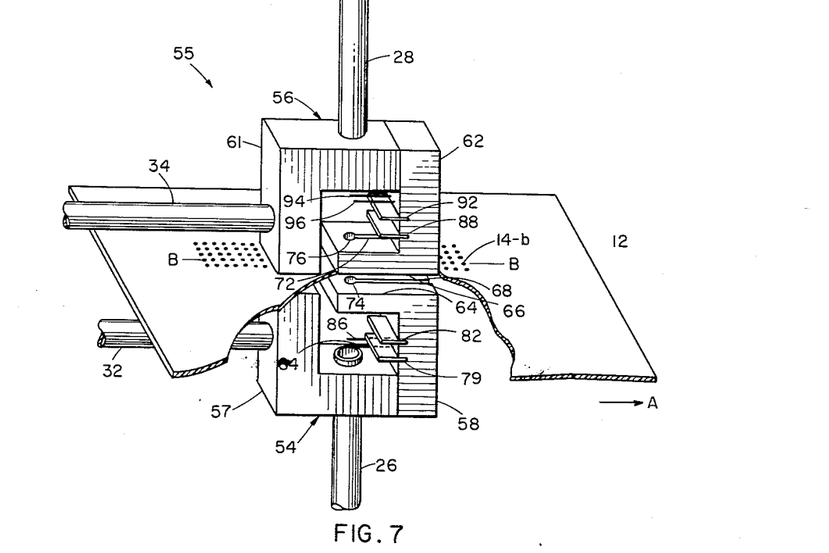
FIG. 7 is an isometric view of the cylinder and head assembly suitable for use with the sub-assembly shown in FIG. 3.

In order to thread cores 14, one row at a time, it is necessary to secure board 12 and to translate the latter in its plane by discrete amounts equal to the distances between core centers along a plane perpendicular to the plane of the cylinders described above. For this purpose there is provided a head assembly 55 which is illustrated along with portions of sub-assembly 25 in FIG. 7. There it will be seen that a pair of supporting heads 54 and 56 are located to support the end portions of cylinders 26, 28, 32 and 34. Head 54 consists of a pair of L-shaped members 57 and 58. As seen in connection with cylinder 26, the latter passes through member 57 and terminates just inside thereof. The other cylinders are similarly mounted. It will be also noted from FIG. 7 that core board 12 is located between the heads 54 and 56 as described in connection with FIG. 3. The view in FIG. 7 is taken from below to show details since cylinders 26, 28, 32 and 34 would be mounted in a horizontal plane and board 12 would be in a vertical plane for best results as will be later understood more clearly.

The second pair of members 61 and 62 similar in shape to members 57 and 58 are mounted as illustrated to provide essentially a surface area between the two opposite head portions of head assembly 55 through which board 12 passes. It will be noted that members 58 and 62 have a pair of legs 64 and 66 facing each other in which there are provided a pair of slots 68 and 72, respectively, which are provided with enlarged openings or holes 74 and 76. Holes 74 and 76 pass completely through legs 64 and 66, respectively, and are on an axis which is perpendicular to board 12 and passes through the center of the particular core which is being threaded at the particular instant. The spacing between the facing surfaces of legs 64 and 66 is such as to sandwich-in board 12 but leave the latter free to be moved. Holes 74 and 76 preferably each have the same diameter as the inside diameter of the particular cores which are being threaded.

As already noted, holes 74 and 76 are aligned with each other and with the particular core being threaded and further with the path of needles 42 and 44 illustrated in FIG. 3.

Figure 8:
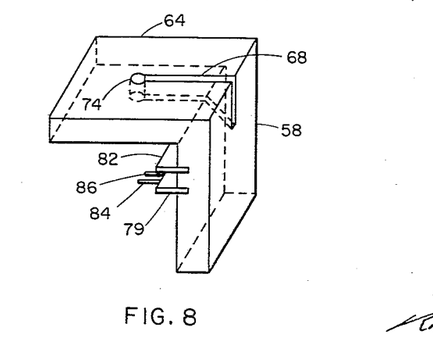
FIG. 8 is a more detailed isometric view of a head illustrated in FIG. 7.

To complete the description of each head 54 and 56, reference is made to member 58, also shown in FIG. 8, which is provided with a pair of flat parallel inserts 79 and 82 which extend from the wall of member 58 not quite reaching an extension of cylinder 26. These inserts 79 and 82 perform a function in connection with the threading operation which will be described further below. In addition, a pair of wires 84 and 86 extend vertically out from member 58, reaching across an extension of cylinder 26. Guiding wires 84 and 86 are parallel to each other and in a plane parallel to board 12. The spacing of inserts 79 and 82 from each other is critical as will become evident from the description further below.

In similar fashion, head 56 is provided with a pair of flat inserts 88 and 92, and a pair of guiding wires 94 and 96. It should be pointed out that inserts 79 and 82 are spaced apart with the mid-point between them aligned with the axis of cylinder 32, and inserts 88 and 92 are similarly disposed with respect to cylinder 34.

The apparatus as described in connection with FIGS. 2 through 7 has been somewhat schematized in order to simplify the description of its operation which follows. It will be noted in FIG. 7 that an arrow A indicates the movement of core board 12, so that, for example, cores 14 in the row designated B—B will be threaded one at a time. To thread row B—B core board 12 is placed in the space separating heads 54 and 56 as shown with end core 14b in row B—B aligned with holes 74 and 76. In FIG. 7, board 12 has already progressed part of the way along row B—B. As FIG. 7 does not show the rods and their supported needles and hooks it will be necessary to refer to FIG. 3 simultaneously to understand the steps in this procedure.

A length of conductor 78 sufficient to interlace all of row B—B is attached at one end to board 12 at some convenient point C beyond the end of the row, and the free end is held extended away from board 12, as shown in FIG. 3. Rod 38 is moved toward board 12 until its needle 44 penetrates successively hole 76 in head 56, core 14b, and emerges through hole 74 in head 54. As needle 44 passes through these holes it is squeezed, but as it comes out through holes 74 and member 58 it resumes its normal rhombic shape. At this point needle 44 comes to rest in the traveling path of hook 52 of rod 46.

Hook 52 is then translated toward head 54 passing through needle 44 and grasping a portion of conductor 78. Inserts 79 and 82 are spaced apart sufficient distance and are located so as to separate the hook elements comprising hook member 52 so that the latter will grasp conductor 78 readily. Piston 46 is then withdrawn so that conductor 78 is pulled through slot 68 in head 54, through the eye of loop of needle 44 and into cylinder 32. The other end of conductor 78 is held fast by its attachment at C to board 12 and thus extends through needle 44 and into tube 32. Then piston rod 38 with conductor 78 passing through the loop of needle 44 is displaced away from board 12 into a fully retracted position in cylinder 28. Conductor 78 thus loops and slips through needle 44 as needle 44 pulls the former through core 14b into cylinder 28, so that when rod 38 becomes fully retracted the free end of conductor 78 slips out of needle 44, and is fully extended without any loops within cylinder 28. Therefore, cylinder 28 must be of sufficient length to accommodate the whole initial length of conductor 78 which at the point just described extends from point C on board 12 through core 14b into tube 28.

Core board 12 is now translated in the direction of arrow A so that the second core in row B—B is aligned with holes 74 and 76 of the heads and the traveling path of needles 42 and 44; and conductor 78 is moved out of hole 76 a small distance down slot 72, for a reason to be later described.

Needle 42 on rod 36 is then advanced through the then aligned core in board 12. Needle 42 penetrates hole 74, head 54, the core, and emerges through hole 76 into head 56. At this point, conductor 78 is in line with the loop of the needle 42, and is also in the traveling path of hook 54 on piston rod 48. Hook 54 is displaced toward head 56, passes through the loop of needle 42, is opened by inserts 88 and 92, and grasps conductors 78. Because conductor 78 is located out of hole 76 down slot 72, needle 42 is between conductor 78 and hook 54 when the former passes through hole 76.

Rod 48 is then retracted away from head 56, pulling conductor 78 through the loop of needle 42. Conductor 78 is thus pulled out of cylinder 34 until it is fully extended. Rod 36 is retracted, drawing conductor 78 into cylinder 26 which is of sufficient length to hold the former as in cylinder 28. Board 12 is then advanced until the next core in the row is aligned with holes 74 and 76.

Guiding wires 84, 86 and 94, 96, perform the function of maintaining or holding conductor 78 within the clasping paths of the various hooks. Inserts 79, 82, and 88, 92, as already noted, restrain conductor 78 as it is first pushed by the hooks and contact the latter so that the hook elements are forced to open slightly to more readily grasp the conductor. While not shown, it is understood that guides or slots in the various cylinders and rods would be utilized to maintain rods 36 and 38 so that the openings in needles 42 and 44 always face cylinders 32 and 34, and the widths of hooks 52 and 54 are always transverse to the length of conductor 78.

To thread the rest of the cores in row B—B the process as described above is repeated, and would, of course, be used also to thread any of the rows other than row B described as well as the rows of cores turned 90° from row B—B shown in FIG. 7.

It is understood that the arrangement just described may be assembled together as illustrated and the needles and hooks manipulated by hand to thread each row faster than can be done by hand alone. Stops may be used as understood in the art if desired to limit the movements of the various elements or may be controlled by the operator alone. In order to speed up the operation of the assembly a motor drive for each movable element may be provided as is well understood in the art, and an observer-operator may be utilized to energize each element by the use of an appropriate switch depending on observation to determine when each step is completed.

Figures 9, 9A, 9B:
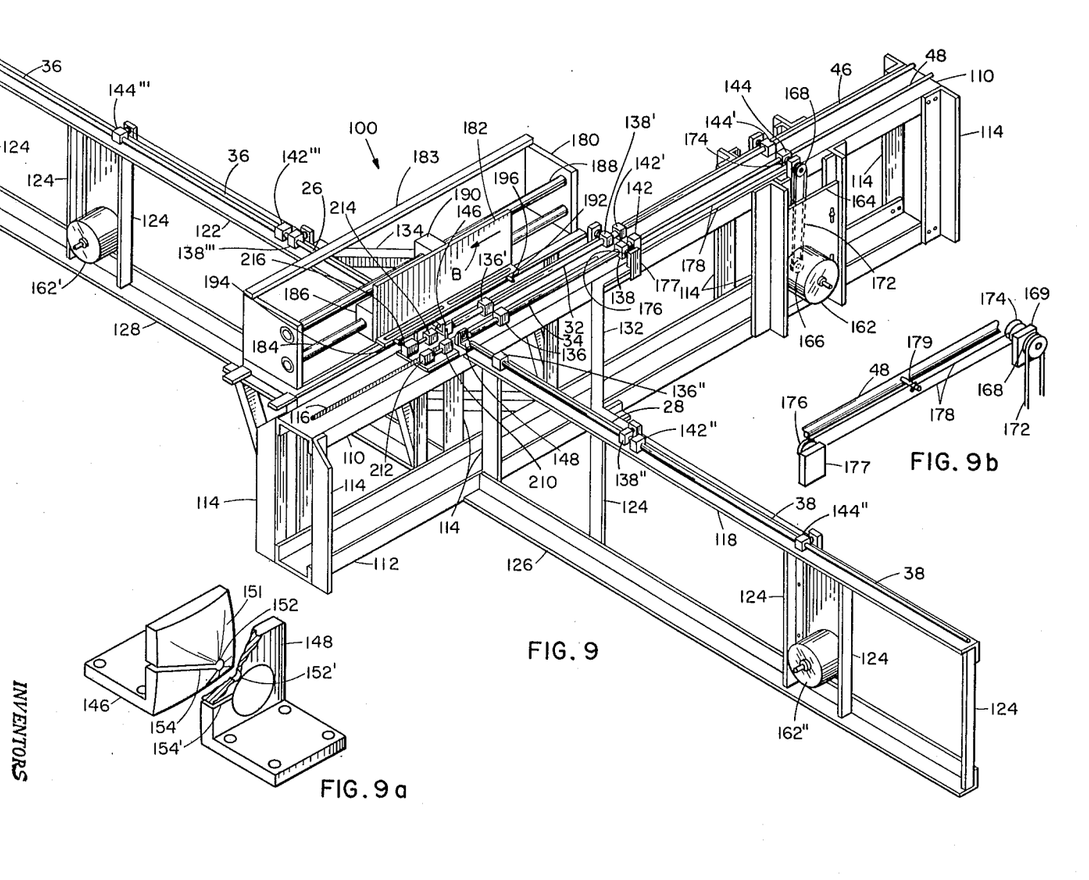
FIG. 9 is an isometric view of a modified version of the invention assembled on a frame for operation.
FIG. 9a is an isometric view showing details of a modified head illustrated in FIG. 9.
FIG. 9b is a detail of a portion of the drive for a hook rod.

In FIG. 9 is shown a frame 100 for supporting a modified threading apparatus as described above. A central or main upper channel 110 is supported in a horizontal plane by a lower channel 112 and a plurality of supporting angles generally designated 114. Upper channel 110 is provided with an elongated slot opening 116 extending sufficient length to accommodate core board 12 in a vertical position for movement in the direction along the length of slot 116. Thus slot 116 would be about twice the length of board 12.

A pair of angles 118 and 122 are mounted to form an overall cruciform configuration of frame 100. One flat surface of each of angles 118 and 122 is in the same plane as the top surface of upper channel 110. Angles 118 and 122 are supported by vertically disposed angles 124 and a pair of bottom angles 126 and 128. A pair of members 132 and 134 interconnecting the upper main channel 110 with upper side angles 118 and 122 by either welding or bolting makes frame 100 into a very rigid structure maintaining the upper surfaces of channel 110 and angles 118 and 122 in a single horizontal plane.

The various pistons and rods of this invention to be now described are located on the upper surfaces of channel 110 and angles 118 and 122 and are supported by blocks having holes to accommodate the tubes or cylinders. For example, cylinder 34 is supported rigidly by a pair of blocks 136 and 138 mounted on channel 110 while piston 48 slidable within tube 34 is supported slidably by a pair of blocks 142 and 144 as illustrated. The other cylinders and tubes are designated to correspond with the same elements in FIG. 3. Tube 32 and rod 46 are supported by blocks 136′, 138′, 142′ and 144′. Tube 28 and rod 38 are supported by blocks 136″, 138″, 142″ and 144″. Tube 26 and rod 36 are supported by blocks 136‴ (not seen), 138‴, 142‴ and 144‴.

A pair of heads 146 and 148, differing somewhat from heads 54 and 56 in FIG. 7, are utilized where illustrated. Details of heads 146 and 148, are found in FIG. 9a. It will be seen that head 146 has an outer rounded or conical surface 151 facing head 148 and has penetrated therethrough at the apex a hole 152 (performing the same function as holes 74 and 76 described in FIG. 3) and a radial slot 154 extending in a horizontal plane which allows for convenient loading the core plane initially with wire and other purposes as will be later seen. Hole 152 is the same or slightly smaller than the inside diameter of the particular cores to be threaded. Head 148 is identical to (but mirror image of) head 146.

The drive system for rods 36, 38, 46 and 48, is also illustrated in FIG. 9. There it will be seen that the drive system for rod 48 consists of a D.C. electric motor 162 supported on one side of a plate 164, a pulley wheel 166 connected directly to motor 162 and a pulley wheel 168 mounted on a plate 169 driven through belt 172 from pulley wheel 166. An idler pulley wheel 176 is mounted adjacent block 138 supported by a plate 177, and a string 178 connects pulley wheels 174 and 176. The string 178 is tied at some convenient point to a screw or catch 179 extending from rod 48 for a direct, reciprocal drive as shown in the detail of FIG. 9b. By reversing current flow to motor 162 with a suitable switch, rod 48 may be driven forward or backward at a rapid rate of speed. Pin 179 moves between plates 177 and 169 which, hence act as stops for the movement of rod 46. String 178 over pulley 174 acts as a slip clutch for this purpose, or if desired, a slip clutch between plate 169 and pulley 174 may be used. Rod 46 is driven by a similar motor and drive assembly (not seen) while rods 36 and 38 are driven by similar motors 162′ and 162″, and their drive arrangements (not seen).

Mounted on top of angle 122 adjacent upper channel 110 along one side thereof is a transport assembly 180 which is box-like in configuration and has a movable carriage 182 which is slidable in the direction of arrow B. Carriage 182 may be moved by a pair of threaded shafts 184 and 188 geared through worms 186 and 190, respectively, if desired. The bottom of carriage 182 is provided with a shoulder 192 which has a pair of pins 194 and 196 to which would be attached core board 12. Carriage 182 holds board 12 which extends through slot 116 in upper channel 110 and maintains board 12 in a vertical orientation and moves it in increments in the direction of arrow B. At the beginning of each row of cores to be threaded, carriage 182 is up at the right end of assembly 180 (as disposed in FIG. 9) and after each core is threaded board 12 is moved in the direction of arrow B so that the next core is aligned between heads 146 and 148. Transport assembly 180 may be manually cranked or motor driven to index carriage 182 to its next position for visual alignment, or some automatic drive and control using spaced micro switches may be used, as to be later briefly described. It will be seen that after a particular row of cores is threaded core board 12 would be unclamped from carriage 182 and moved down or up to the next row and carriage 182 moved back to the beginning of the row. It is understood that an electric motor, as later described, similar to the other electric motors described may be utilized to move carriage 182 in accordance with the process conducted.

A refinement in the head arrangement for increasing the speed of the threading operation is shown schematically in FIG. 9 represented by a pair of units 210 and 212 adjacent head 148. A similar set of units 214 and 216 are shown mounted adjacent head 146. The details of this arrangement are given in FIG. 10 in connection with units 210 and 212.

Figure 10:
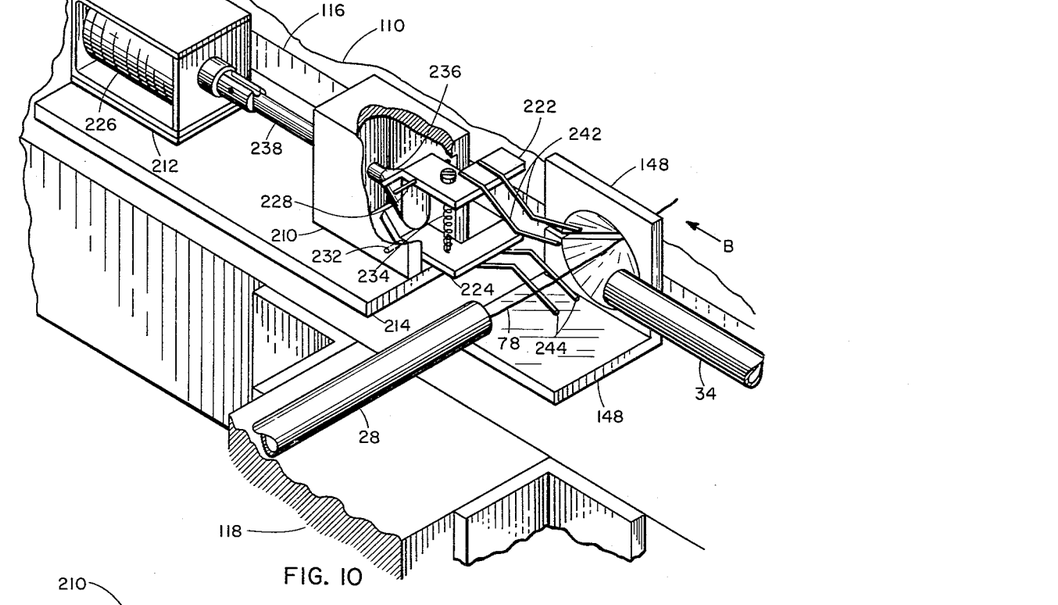
FIG. 10 is a detail of FIG. 9.

Referring to FIG. 10 it will be seen that units 210 and 212 are hollow boxes mounted on a plate 214. Unit 210 supports flat finger holding members 222 and 224 which are pivoted about pins 228 and 232. Unit 212 contains a solenoid 226 to actuate members 222 and 224 as will be later seen. A spring member 234 interconnects members 222 and 224 to bias them in the direction of separating them as in FIG. 11. Two pair of wire holding fingers 242 and 244 extend from members 222 and 224 for a purpose to be later described. On the other side of pins 228 and 232 is the conical end 236 of a shaft 238 which extends through the end wall of unit 210 into unit 212 and terminates in solenoid 226. There it is seen that when solenoid 226 is energized shaft 238 is moved to the left as indicated by arrow C in FIG. 12 so that conical end 236 of shaft 238 tends to pivot fingers 242 and 244 together. When solenoid 226 is de-energized shaft 238 is moved to the right as indicated by arrow D in FIG. 11, permitting spring 234 to separate fingers 242 and 244. The effect of this arrangement is to hold conductor 78 aligned with the axis of rod 48 holding hook 54 in cylinder 34 advancing to grab conductor 78 as shown in FIG. 12.

The operation of this assembly just described to hold conductor 78 in place falls into the overall sequence of operation of the apparatus in the following way. During the period of time when conductor 78 is fully extended into needle containing cylinder 28 (as in FIG. 10), needle 42 will advance through heads 146 and 148 and stop between conductor 78 and hook 54. The latter advances through the inside of needle 42 and grabs conductor 78 to then pull the latter back through needle 42 into cylinder 34. At the time when needle 42 begins its advance through heads 146 and 148, solenoid 226 is energized so that fingers 242 and 244 will clamp conductor 78 in place (as in FIG. 12) to permit the latter to be aligned with hook 54 and needle 42. When hook 54 has grabbed conductor 78, or if desired, when hook 54 is retracted, solenoid 226 is de-energized to retract fingers 242 and 244.

Figure 11:
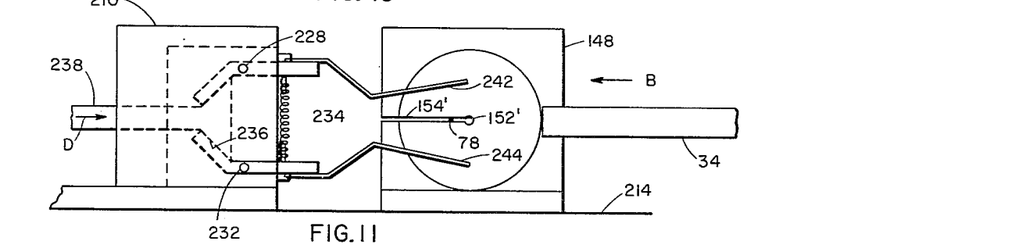
FIGS. 11 and 12 illustrate the operation of the detail shown in FIG. 10.
Figure 12:
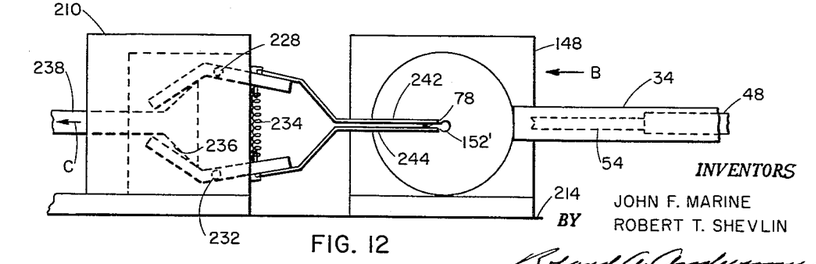

It will be seen in FIGS. 11 and 12 that conductor 78 is in slot 154' off to the left of hole 152'. This displacement insures that when needle 42 advances from hole 152' it will be then between conductor 78 and hook 54. Movement of conductor 78 out of hole 152' to permit needle 42 to pass through unopposed is brought about (as previously explained) by the indexing of board 12 which moves in the direction of arrow B after conductor 78 is pulled into cylinder 28 by needle 44 as shown in FIG. 10.

It should be apparent that the wire holding assembly just described forms an additional function in the operation of this apparatus. At the beginning of each row or cores, it was earlier pointed out that the end of conductor 78 is attached to some point opposite the first core of the row to be threaded. In order to begin threading the row, conductor 78 is pulled through the slots in heads 146 and 148, and solenoid 226 is energized so that fingers 242 and 244 will hold conductor 78 in position for the start of the threading operation.

Figure 13:
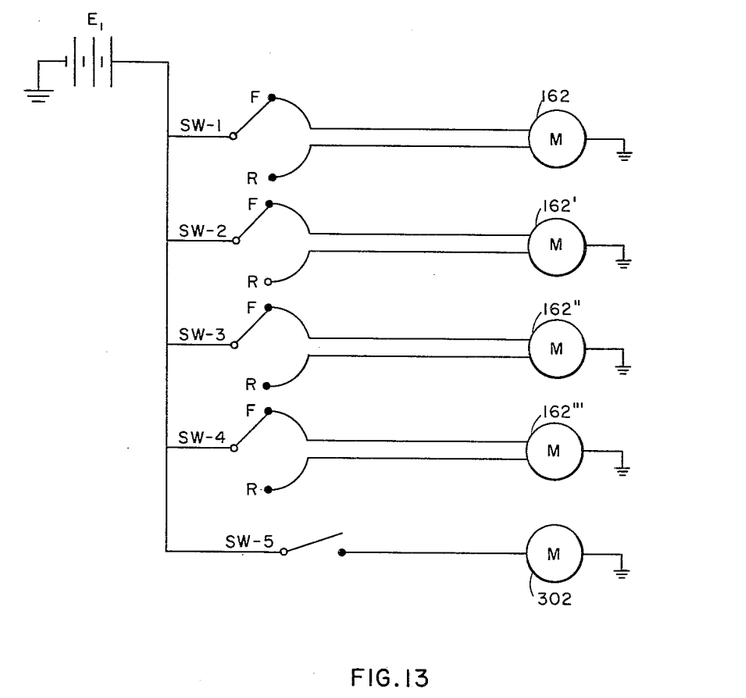
FIG. 13 is a schematic of a suitable electrical drive for use with the device of FIG. 9.

In the operation of the apparatus shown in FIG. 9, the various electric motors described may be energized in the manner illustrated in FIG. 13. It will be seen that motors 162, 162', 162" and 162'" are provided with double pole switches SW-1, SW-2, SW-3 and SW-4, respectively, each having forward (F) and reverse (R) drives for their respective motors. There is also provided a motor 302 which is energized by a switch SW-5 to advance carriage 182 from core to core between threading steps. The cores may be aligned visually or by a pointer extending from carriage 182 to a cross member 183 which would be provided with calibrations spaced identically with the cores. An electrical source E1 provides the power for the various motors. A power switch (not shown) between E1 and switches would be used to cut off power to the machine when not in use. An operator would be provided with a program chart and would operate the switches in accordance with the program.

If desired, the whole operation may be made automatic by using either limit or light sensitive switches to sequence the various operations.

While only preferred embodiments of this invention have been described, it should be understood that numerous modifications or alterations may be made therein without departing from the spirit and the scope of the invention as set forth in the appended claims.

We claim:

1. A magnetic core plane threading machine for interlacing with a flexible conductor a row of spaced, hollow elements mounted in a flat board, comprising, in combination, means for transferring a sufficient length of said conductor to interlace the whole said row back and forth through said board, and means for advancing said board along said row to permit said conductor to be passed back and forth through successive hollow elements in said row, said transferring means including a pair of needle means for making the actual transfer of said conductor through said elements and hook means for each of said needle means for threading a needle means to permit the latter to make the aforesaid transfer.

2. The threading machine of claim 1 in which means are provided to hold said conductor in proper position for each of said hook means to engage said conductor prior to threading a needle means.

3. The threading machine of claim 2 in which each of said needle means, hook means, and board advancing means is provided with an independent drive arrangement to permit all of the operations to be adjusted for proper, sequential operation.

4. A magnetic core plane threading machine for interlacing with a flexible conductor a row of spaced, hollow elements mounted in a flat board, comprising, in combination, a pair of spaced threading heads having formed therein facing needle holes, means for supporting said board between said heads and for aligning a hollow element with said holes, a pair of oppositely facing first and second needle means aligned with said holes on opposite sides of said first and second heads, respectively, each of said needle means having a loop member at the end thereof facing its respective head, a pair of parallel first and second elongated hook means on opposite sides of said board parallel to the plane of said board and in a common plane with said needle means, said hook means each terminating in a hook member and axially slidable for moving each of said hook members across the path of said needle means and away from said heads, said first needle means being axially reciprocal in advancing its loop member through said holes and aligned hollow member coming to rest along the axis of said second hook means, said second hook member advancing through said first needle loop member to engage a portion of said conductor, which is extending from said board, through at least said second head hole, said second hook member being withdrawn to draw said conductor back through said first needle loop member, said first needle member being then retracted to draw said conductor back through said holes and aligned hollow member until said conductor extends its full length along the axis of said first needle means away from said first head, said board being then advanced until the next hollow member is aligned with said holes, and said second needle loop member is advanced through said holes and next hollow member up to alignment with the axis of said first hook means to repeat the sequence as aforesaid, thereby alternating between said first and second needle means to transfer said conductor back and forth between successive hollow members to interlace an entire row of hollow members with said conductor.

5. The threading machine of claim 4 in which said heads are provided with slots extending from said holes in the plane of said needle and hook means away from said hook means, and said board is advanced in the same direction as said slots extend from said holes, with the result that as each hollow element is advanced, said conductor will be moved out of said holes into said slots to permit said needle loop members to move between said conductor and the hook members thereby insuring proper threading of said needle loop members.

6. The threading machine of claim 5 in which means are provided to clamp said conductor in place properly aligned with said hook means prior to engagement by the latter.

7. A method of interlacing with a flexible conductor a row of spaced, hollow elements mounted in a flat board, comprising, the steps of attaching one end of said conductor of sufficient length to interlace the whole said row to a point on said board at the beginning of said row, passing a first needle through the first element in said row to the side of said board to which said conductor is attached, threading said needle with the free end of said conductor, withdrawing said needle back through the first said element thereby pulling through said conductor until the latter is fully extended, advancing said board a distance equal to the spacing between elements in said row, passing a second needle through the second element in said row to the side where the free end of said conductor is extended, threading said second needle with the free end of said conductor, withdrawing said second needle back through said second element thereby pulling through said conductor until the latter is fully extended, advancing said board to the third said element, and repeating the aforesaid steps until the whole row of elements is interlaced by said conductor.

References Cited in the file of this patent

UNITED STATES PATENTS

| | | |
|---|---|---|
| 1,485,827 | Bull | Mar. 4, 1924 |
| 2,191,647 | Edge | Feb. 27, 1940 |
| 2,325,461 | Arthur | July 27, 1943 |
| 2,420,512 | Woller | May 13, 1947 |